Feb. 26, 1963 W. T. STANLEY 3,078,623
FINISHING APPARATUS AND METHOD
Filed May 13, 1960 2 Sheets-Sheet 1
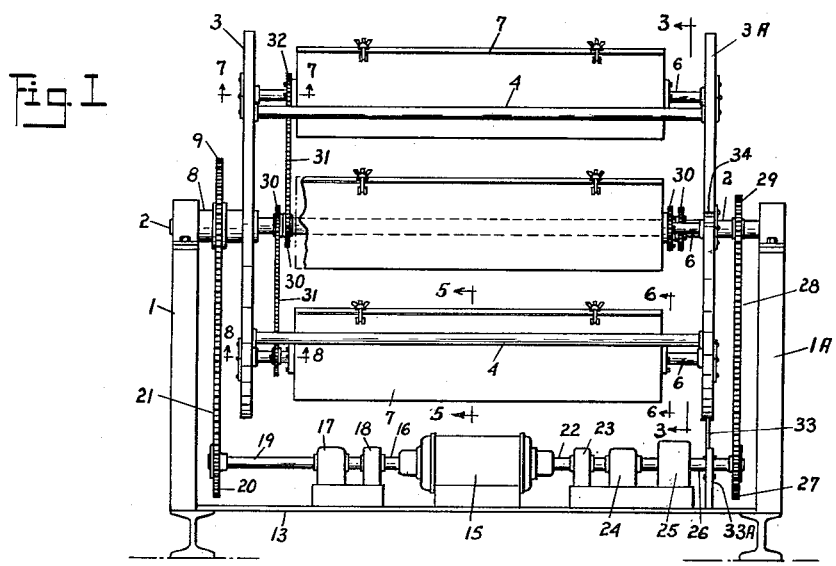
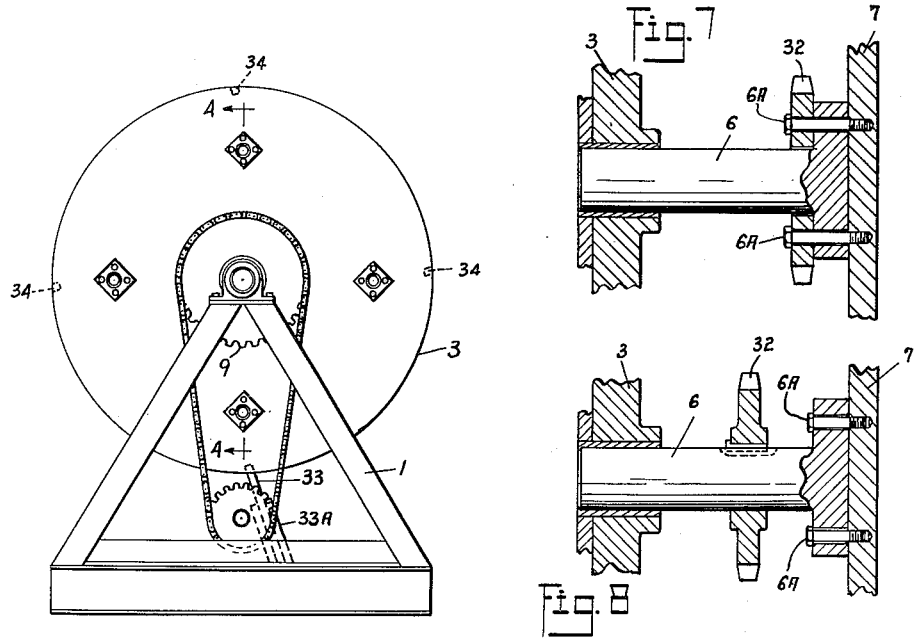
INVENTOR.
WILLIAM T. STANLEY
BY
Teare & Fetzer
ATTORNEYS Feb. 26, 1963 W. T. STANLEY 3,078,623
FINISHING APPARATUS AND METHOD
Filed May 13, 1960 2 Sheets-Sheet 2
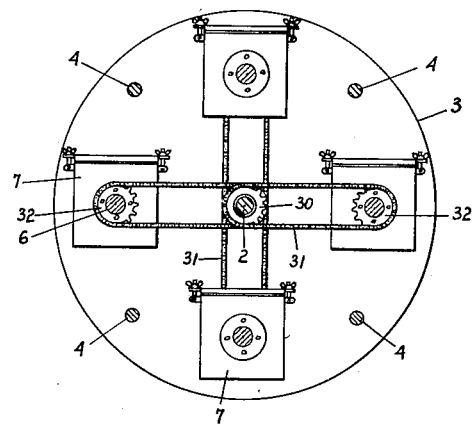
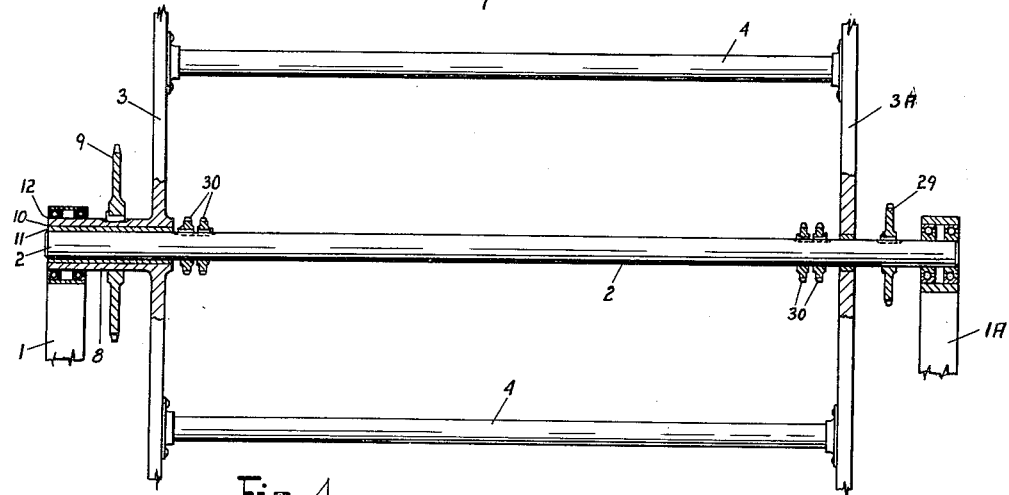
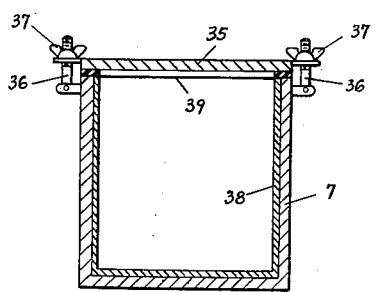
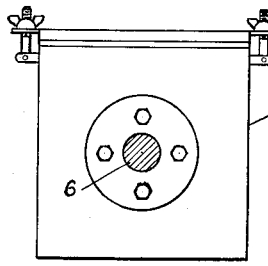
INVENTOR.
WILLIAM T. STANLEY
BY
Teare & Felzer
ATTORNEYS 3,078,623
FINISHING APPARATUS AND METHOD
William T. Stanley, Gates Mills, Ohio
Filed May 13, 1960, Ser. No. 29,006
3 Claims. (Cl. 51—164)

This invention relates to an improved finishing apparatus and method in which the finishing of articles is accomplished by the mechanical action of various articles upon each other, or by the interaction of such articles and other solid objects.

The present invention constitutes an improvement on the apparatus and method described and claimed in my Letters Patent of the United States No. 2,561,037, issued July 17, 1951. Briefly, the structure of the patent utilizes a motor to drive a shaft on which arms or plates are mounted. A number of barrels or containers are journaled in the ends of the respective arms, and are, in turn, provided with means for rotating them including chains and sprockets, the latter of which are rigidly mounted on a sleeve which in turn is fixed to the frame, so that the sprockets remain stationary while the main shaft of the device rotates. The net result of the foregoing construction is that by utilizing a 1:1 ratio between the sprocket wheel on the sleeve and the sprocket wheel on the end of each of the shafts on which the containers are journaled, the containers remain in substantially the same horizontal position as they revolve around the frame. Under such arrangement centrifugal force operates to throw the material within the containers by a smooth sliding action against the side which is remote from the axis as the containers revolve.

The present invention constitutes an improvement on the device shown in Patent No. 2,561,037 in that the containers are so mounted as to be capable of rotation independently of and in the same direction with the rotation of the supporting turret structure. As a result of this, the motor which is used for bringing the turret assembly up to speed can exert its full force for that purpose whereas, otherwise, a greatly increased torque would result in attempting to overcome the inertia of rotating the containers during the initial period of bringing the unit up to normal operating speed. This would not only place an undue strain upon the motor and require excess current for the operation of the unit but would result in a harsh tumbling action of the material within the containers causing distortion, nicks, and impingement upon the surface of the articles to be finished.

To the accomplishment of the foregoing and related ends, the invention, then, comprises the features hereinafter fully described and particularly pointed out in the appended claims, the following description and annexed drawings setting forth in detail certain illustrative embodiments of the invention, these being indicative, however, of but a few of the ways in which the principle of the invention may be employed.

In the annexed drawings:

FIG. 1 is a side elevational view of an apparatus in accordance with the present invention;

FIG. 2 is an end view of the apparatus shown in FIG. 1;

FIG. 3 is a sectional view taken on the line 3—3 of FIG. 1;

FIG. 4 is a fragmentary sectional view taken on the line 4—4 of FIG. 2;

FIGS. 5 and 6 are sectional views taken on the lines 5—5 and 6—6 respectively of FIG. 1;

FIGS. 7 and 8 are fragmentary sectional views on an enlarged scale, taken on the lines 7—7 and 8—8 respectively of FIG. 1.

Referring now more particularly to the annexed drawings, in FIG. 1 there is shown a frame having standards 1 and 1A in which a main shaft or turret spindle 2 is journaled. Supported on the turret spindle 2 are a pair of end plates or discs 3 and 3A which may be maintained in spaced apart relation by spacer rods 4. Circumferentially disposed in opposing relationship between the end plates 3 and 3A of the turret, are a plurality of stub shafts 6, each pair carrying a container 7, as by fastening members 6A. The shafts 6 are each journaled for rotation in the plates 3. The main shaft or spindle 2 is free to rotate independently of the end plates 3 and 3A.

The end plate 3 may be provided with a hub 8 which is fixedly attached thereto and is provided with a sprocket 9. The hub 8 is journaled for rotation in the supporting standard 1, and is provided with a bore 10 and a bearing liner 11 for receiving the main shaft or spindle 2. Suitable bearing means, such as roller or ball bearings 12, carried by the support 1 provide rotatable support for the hub 8.

As shown in FIG. 1, there is provided on a base 13 driving means in the form of an electric motor 15. The motor may be provided with a shaft 16 which may be conveniently coupled to a variable speed transmission 17 through a suitable coupling such as a magnetic drive 18, or a fluid drive mechanism. The shaft 19 from the transmission 17 may be provided with a sprocket 20 which is drivingly connected with the sprocket 9 by means of a chain 21. The motor 15 is desirably of the double end reversible type, and the opposite end thereof is provided with a shaft 22 which is an extension of the armature. In like manner to the opposite side of the motor above described, there is an auxiliary power takeoff assembly including desirably fluid transmission means 23, variable speed transmission 24 and a clutch 25 for selective engagement and disengagement of the motor from the shaft 26 which carries a sprocket 27. The sprocket 27 is drivingly coupled by means of a chain 28 to a corresponding sprocket 29 fixedly attached to the main shaft 2.

The main shaft 2 is also provided with a plurality of sprockets 30 fixedly attached thereto, and drivingly connected by means of chains 31 to corresponding sprockets 32 fixedly attached to one of each pair of stub shafts 6. As shown in FIGS. 7 and 8, the stub shafts 6 are journaled for rotation in the end plate 3, and the inner free end of each such shaft is secured to the end of a container 7.

To facilitate emptying of the individual containers 7 there is provided a turret lock bolt 33 which may be slidably mounted in a bracket 33A and manually operable to engage a notch 34 in the end plate 3A for holding the assembly in a fixed position.

The containers 7 are shown as generally rectangular open-topped boxes, the tops being closed by lids 35 secured to the container by pivoted bolts 36 and wing nuts 37. A lining 38 may be provided for each container and a gasket 39 may be interposed between the container top and the lid 35 so that when the lid 35 is clamped shut, a water tight seal is produced.

In operation, the containers 7 are filled with material comprising parts to be finished and abrasive material, such as granite chips, to which may be added water if desired. The material for operating upon the articles may be abrasive as indicated above, or it may be a material which has a burnishing, or similar action, or the articles alone may act upon each other in which event, with reference to any one article, the other articles constitute the working material. Hence, the term "working material" will be used herein to define any substance capable of acting on the articles in a mechanical manner whether by abrasion, burnishing, or the like, or to other articles, and will be understood to include both solids and liquids as well as mixtures of solids and liquids. Also the process and apparatus may be used when the desired product is the complete reduction of the articles to a pulverized or granulated or other finely divided state. All such operations are, therefore, to be comprehended by the terms "finishing" and "finished article" as used herein. To prepare the apparatus for operation, the clutch 25 is disengaged, the containers are filled serially with articles and working material to a suitable depth, i.e. about half full. In order to maintain balance, the charge in each container 7 is desirably weighed out and equalized. After each of the containers has been filled to the desired extent, the stop 33 is disengaged from the end plate 3A, and the motor 15 is energized. This causes the rotation of the turret about its axis, the main shaft 2 remaining stationary with respect to the turret. When the turret is rotating at the predetermined speed, the clutch 25 may then be engaged to impart rotation through the sprockets 27 and 29 drivingly connected by the chain 28 to the shaft 2. Rotation of the shaft 2 causes rotation of the sprockets 30 fixedly attached thereto, thereby imparting an independent rotatory motion to the containers 7 and in the same direction with the rotating turret, thereby effecting a smooth sliding action on the material contained in each container without nicking or otherwise distorting the precision surfaces of the articles to be finished. After the charge has been rotated in the manner aforesaid for a period of time sufficient to effect the desired finishing operation, the clutch 25 is disengaged thereby suspending the planetary motion of the containers 7. At this point, the motor may be deenergized and permitted to coast spontaneously to rest, or the current on the field of the motor may be reversed to provide a dynamic braking effect. With the clutch 25 in the disengaged position, the containers 7 can be rotated by hand to place the lids in a horizontal position. With the stop 33 in engaged position on the end plate 3A, one of the containers can be maintained in a position suitable for discharging the contents thereof. After discharge of the container, the turret can be revolved a sufficient amount to bring the next container into position for discharge, and the operation repeated until the apparatus is completely empty.

In selecting the components for the drive mechanism, the magnetic or fluid drive couplings 18 and 23 should be at least equal to the motor horsepower rating. Likewise the variable speed transmission devices 17 and 24 also have a horsepower rating at least equal to that of the motor. The clutch likewise has a horsepower rating equal to that of the motor and may be manually or electrically operated.

If desired, two independent motors may be utilized, one for the turret drive, and the other for the container drive. In the latter instance, the turret drive would be operated initially prior to the motor for driving the containers so as to bring the entire apparatus up to the normal speed. Thereupon, the motor for operating the containers would be driven and that in turn would cause the rotation of the containers upon their respective axes while the turret drive is in operation. The net result of this would be to rotate the containers on their own axes while they are being revolved about the axis of the main shaft in a planetary fashion.

By varying the speed of the turret, any desired centrifugal force may be applied to the working material, the only limitation being the ability of the particular machine to withstand the forces of gravity involved. For the purpose of this application, the force of one gravity will be indicated as "G." It has been found that, for general use, an operating turret range from 2 G's to 16 G's is satisfactory and that a barrel rotation range of from 1 r.p.m. to 200 r.p.m. is satisfactory. The turret speed range preferably is between 70 r.p.m. and 200 r.p.m. for a machine having a distance of 14" from the axis of the spindle 2 to the axis of each shaft 6.

The optimum G force and the optimum barrel rotation speed vary with the character of the material within the container. For example, an article which will distort easily or which is made of relatively soft material should be processed with a relatively low G force, and with a relatively low barrel rotation speed. On the other hand, small hardened steel parts may be processed with a relatively high G force and with a relatively high barrel rotation speed. Factors which have an influence on the desired speed are the weight of the article, the shape, the strength, the hardness and the finish required thereon. In general, a turret speed resulting in a low G force is best suited for elimination of distortion and for holding impingement of the articles to a minimum. On the other hand, high G forces are permissible for small hardened parts which will not distort or be damaged by impingement.

The optimum container or barrel speed of rotation may also vary dependent upon the characteristics of the article, its shape, strength, hardness and the desired degree of finish. In general, the slower speeds tend to reduce the working action, but at the same time, keep the parts from distortion and impingement. Thus, fragile parts or parts of relatively soft material would be processed at a relatively slow barrel rotation speed while hardened parts which are not subject to distortion or damage from impingement may be processed at relatively high barrel rotation speeds.

As an example, a soft aluminum disc $\frac{3}{8}$" in diameter, $\frac{1}{32}$" thick can be satisfactorily processed at 3.2 G's with a barrel rotation of 50 r.p.m. The same size part of hardened steel can be satisfactorily processed at 14.4 G's with a barrel rotation of 190 r.p.m. The foregoing is satisfactory in a structure wherein the container is square in cross section with an inside dimension of 6" for the width of each wall, and wherein the distance from the axis of the central shaft 2 to the axis of each container supporting shaft 6, is equal to 14". At 3.2 G's the turret rotation is 90 r.p.m. and at 14.4 G's, the turret rotation is 190 r.p.m. The formula for determining the G's in such structure, is as follows:

$$G\text{'s} = .000341 \times \text{radius (in feet)} \times \text{r.p.m.}^2$$

or $$G\text{'s} = .000341 \times 1.17 \times \text{r.p.m.}^2$$

or $$G\text{'s} = .0004 \times \text{r.p.m.}^2$$

In operation, and assuming that the containers have been loaded with material and the lids closed, the clutch 25 is disengaged and the turret lock bolt 33 is moved out of engagement with the notch 34 in the plate 3A. Thereupon the motor 15 is started, while the magnetic or fluid drive connection 17 slips as the turret is brought up to the desired speed. Thus, all the rated horsepower of the motor is utilized to impart inertia to the turret and the working material is held against the outer wall of the container thus reducing the undesirable tumbling action as the turret is being brought up to its desired operating speed. When the turret reaches the desired speed, then only sufficient power is used to overcome friction losses and wind resistance, to maintain such speed with the motor running far below the rated horsepower. At such time, the main shaft 2 is not turning with the turret while the barrels or containers are held in stationary position by virtue of the centrifugal force operating on the material within the containers during the rotation of the turret.

After the turret has been brought up to the desired speed, then the barrels or containers may be rotated in the same direction on their respective axes by engaging the clutch 25. At such time, substantially all of the power of the motor is available for rotating the barrels except for the small percentage required to maintain the turret in rotation. The magnetic or fluid drive connection 24 slips while the containers are being brought up to speed, thus allowing the best torque conditions for the motor and taking up for the shock incident to starting the rotation of the containers which eliminates the harsh and undesirable tumbling action otherwise imparted to the surfaces of the articles to be finished from the work material.

To stop the machine, the clutch 25 is disengaged, as a result of which the containers cease their rotation, the current of the motor is reversed, thus utilizing a dynamic braking action through the turret magnetic or fluid drive transmission, and the machine is brought quickly to a stop. Such an arrangement provides a smooth sliding action until rotation of the containers about their respective axes is stopped. Cessation of rotation of the containers occurs before the turret rotation is reduced in the process of stopping. During such reduction of the turret, rotation continues until the turret is stopped, the mass is held by centrifugal force against the wall which is most remote from the axis of the turret, without relative motion to the container. The motor switch is turned to the off position and then the turret is turned by hand until the lock bolt 33 engages a notch 34 in the plate 3A. At such time one of the containers is in position for removing the contents. The removal may be quickly accomplished by engaging the clutch 25 and then pressing the motor switch quickly to the on and off position. This will cause the motor to slowly rotate the barrels, thereby emptying any barrel from which the lid has been removed. When the container is empty, the motor switch is again moved quickly to the on and off position to rotate the containers slowly, and to stop them when the empty barrel is in the open position ready for reloading. During this operation, the turret, magnetic or fluid drive slips because of the fact that the turret is locked against rotation. The container is reloaded, and then the lid is replaced and locked.

To move another container into unloading position, the motor switch is moved quickly to on and off position, as a result of which the turret is rotated slowly until the next container is in position for unloading. Thereupon, the preceding cycle is repeated.

An advantage of the present invention is that rotation of the turret can be controlled independently of the containers, as a result of which the turret can be brought up to speed quickly without placing an objectionable load upon the motor, and that thereafter the containers can be rotated at any selective speed which may vary from that of the turret. Thus, the machine is flexible insofar as concerns control of rotation, thereby enabling an operator to utilize the optimum speed and gravity in accordance with the physical characteristics of the articles to be processed.

I claim:

1. An article finishing apparatus comprising in combination a stationary support, a rotatable shaft freely journaled on said support, a turret rotatably supported on said shaft, a plurality of containers each journaled on said turret, motor means mounted on said support, first driving means at one end of said shaft operably connected to said motor means for independently rotating said turret relative to said shaft, second driving means at the other end of said shaft operably connected to said motor means for driving said shaft in the same direction as the rotation of the turret, and for rotating the containers independently of the turret, and clutch means interposed between said motor means and said last mentioned driving means, whereby said containers can be held against rotation on their own axes while the turret is drivingly rotated, and whereby said containers can be drivingly rotated independently of the turret while the turret is being drivingly rotated, upon selective disengagement and engagement of said clutch means respectively.

2. An apparatus according to claim 1, wherein said first driving means includes chain and sprocket means drivingly connecting said motor means to said turret, said second driving means including chain and sprocket means drivingly connecting said motor means to said shaft, and other chain and sprocket means operatively connecting said shaft to the respective containers.

3. A method of finishing articles within containers which are mounted on a motor driven turret for independent rotation with and parallel to the axis of the motor driven turret, comprising confining a loose mass of articles and finishing material within the containers, revolving the turret and the containers about the axis of the turret up to a predetermined operating speed which is sufficient to cause centrifugal force to overcome the effect of gravitational forces acting on the mass within the containers so as to hold the mass against the container walls which are most remote from the axis of the turret, then independently rotating the containers on their own axes and parallel to the rotational axis of the turret for effecting a smooth sliding action of the mass within the containers, discontinuing rotation of the containers about their own axes and then gradually stopping rotation of the turret, whereby during such gradual stopping of the turret, the mass is held by centrifugal force against the walls of the containers which are most remote from the axis of the turret.

References Cited in the file of this patent

UNITED STATES PATENTS

| 1,144,272 | West | June 22, 1915 |
| 2,561,037 | Stanley | July 17, 1951 |
| 2,937,814 | Joisel | May 24, 1960 |